US 7,789,426 B2

(12) United States Patent
Hanscom

(10) Patent No.: US 7,789,426 B2
(45) Date of Patent: Sep. 7, 2010

(54) TRAILER STABILIZING DEVICE AND METHOD OF USING SAME

(76) Inventor: Paul Hanscom, 9609 Lake Pyramid Ct., Bakersfield, CA (US) 93312

( * ) Notice: Subject to any disclaimer, the term of this patent is extended or adjusted under 35 U.S.C. 154(b) by 283 days.

(21) Appl. No.: 12/123,013

(22) Filed: May 19, 2008

(65) Prior Publication Data

US 2008/0217898 A1 Sep. 11, 2008

Related U.S. Application Data

(63) Continuation-in-part of application No. 11/588,662, filed on Oct. 26, 2006, which is a continuation-in-part of application No. 10/899,921, filed on Jul. 26, 2004, now Pat. No. 7,338,052.

(51) Int. Cl.
*B60S 9/08* (2006.01)
(52) U.S. Cl. .................................. 280/763.1
(58) Field of Classification Search .............. 280/763.1, 280/755, 754
See application file for complete search history.

(56) References Cited

U.S. PATENT DOCUMENTS

| | | |
|---|---|---|
| 1,445,239 A | 2/1923 | Reddig |
| 1,488,406 A | 3/1924 | Morrison |
| 2,361,690 A | 10/1944 | Hunz ........................... 254/110 |
| 2,571,067 A | 10/1951 | Seckenkdorf ............ 254/133 R |
| 2,572,410 A | 10/1951 | Van Doorne ............. 280/763.1 |
| 2,926,889 A | 3/1960 | Obes ........................... 254/419 |
| 2,942,676 A | 6/1960 | Kraus |
| 3,096,065 A | 7/1963 | Horn ........................ 248/354.3 |
| 3,169,012 A | 2/1965 | Fagan ........................... 254/419 |
| 3,281,160 A | 10/1966 | Vinther et al. .............. 254/420 |
| 3,322,392 A | 5/1967 | Hoffman |
| 3,367,614 A | 2/1968 | Leonard |
| 3,471,168 A | 10/1969 | Lotesto et al. |
| 3,475,008 A | 10/1969 | Taylor ......................... 254/424 |
| 3,536,337 A | 10/1970 | Molnar .................... 282/764.1 |
| 3,537,724 A | 11/1970 | Matthews |
| 3,656,778 A | 4/1972 | Bristol ..................... 280/763.1 |
| 3,690,694 A | 9/1972 | Hemdon et al. .......... 280/763.1 |
| 3,741,586 A | 6/1973 | Wiczer |

(Continued)

OTHER PUBLICATIONS

"Statement of Substance of the Telephonic Interview conducted on Jan. 20, 2010," and filed with the USPTO on Feb. 10, 2010. The document is from the parent U.S. Appl. No. 11/588,662.

(Continued)

*Primary Examiner*—Eric Culbreth
*Assistant Examiner*—Karen Jane J Amores
(74) *Attorney, Agent, or Firm*—Burns & Levinson LLP; Jacob N. Erlich; Yakov M. Korkhin

(57) ABSTRACT

An apparatus for stabilizing a stationary trailer with an adjustable length leg member. The apparatus comprises a ground engaging base plate which is attached to the end of the adjustable length leg member and has attachment means for one or more stabilizing members. The first end of the stabilizing member attaches to the ground engaging base plate and the second end of the stabilizing member attaches to an attachment member depending from the trailer. The attachment member is adapted to slidably receive the second end of the stabilizing member and comprises locking means for engaging the stabilizing member and locking the stabilizing member with respect to the attachment member.

24 Claims, 15 Drawing Sheets

U.S. PATENT DOCUMENTS

| | | | |
|---|---|---|---|
| 3,782,749 A | 1/1974 | Wiczer | |
| 3,791,676 A | 2/1974 | Spratlen | 280/475 |
| 3,823,958 A | 7/1974 | Trejbal | 280/763.1 |
| 3,836,173 A | 9/1974 | Schwaiger | 280/763.1 |
| 3,874,696 A | 4/1975 | Gardner et al. | 254/419 |
| 3,933,372 A | 1/1976 | Herndon | 280/763.1 |
| 4,097,840 A | 6/1978 | Chappelle | 340/431 |
| 4,218,094 A | 8/1980 | Leaver | 298/17 B |
| 4,268,066 A | 5/1981 | Davis | 280/763.1 |
| 4,340,100 A | 7/1982 | Anderson, II | 269/41 |
| 4,429,851 A | 2/1984 | DeJager | 248/354.5 |
| 4,562,673 A | 1/1986 | Barari | 52/167.1 |
| 4,589,632 A | 5/1986 | Smith | |
| 4,596,196 A | 6/1986 | Gunter et al. | 108/169 |
| 4,611,948 A | 9/1986 | Johnson | 403/232.1 |
| 4,708,362 A | 11/1987 | Raetz | 280/763.1 |
| 4,997,203 A | 3/1991 | Jensen | 280/763.1 |
| 5,042,779 A | 8/1991 | Eden | |
| 5,111,632 A | 5/1992 | Turner | 52/702 |
| 5,137,297 A | 8/1992 | Walker | 280/414.5 |
| 5,205,586 A | 4/1993 | Tallman | 280/764.1 |
| 5,217,209 A | 6/1993 | Anders | 254/419 |
| 5,224,688 A | 7/1993 | Torres et al. | |
| 5,271,596 A | 12/1993 | Holcomb et al. | |
| 5,348,330 A | 9/1994 | Few et al. | 280/475 |
| 5,405,160 A | 4/1995 | Weaver | |
| 5,409,251 A | 4/1995 | Thorndyke | 280/475 |
| 5,423,518 A | 6/1995 | Baxter et al. | |
| 5,451,076 A | 9/1995 | Burkhead | |
| 5,474,330 A | 12/1995 | Meehleder | 280/763.1 |
| 5,509,687 A | 4/1996 | Thorndike | 280/766.1 |
| 5,527,054 A | 6/1996 | Williams | 280/475 |
| 5,575,492 A | 11/1996 | Stone | 280/475 |
| 5,575,493 A | 11/1996 | Schwartz et al. | 280/475 |
| 5,901,980 A | 5/1999 | Few et al. | |
| 5,984,342 A | 11/1999 | Ysker | 280/492 |
| 6,062,524 A | 5/2000 | Jackson, Sr. | 248/352 |
| 6,095,474 A | 8/2000 | Arnold | 248/352 |
| 6,139,056 A | 10/2000 | Sourdeau | 280/763.1 |
| 6,142,488 A | 11/2000 | Orr | 280/6.153 |
| 6,309,165 B1 | 10/2001 | Hahn et al. | 414/401 |
| 6,331,016 B1 | 12/2001 | Wallace et al. | 280/763.1 |
| 6,443,413 B1 | 9/2002 | Hawkins et al. | |
| 6,494,487 B1 | 12/2002 | Nebel | 280/765.1 |
| 6,629,701 B1 | 10/2003 | Colibert | 280/455.1 |
| 6,695,348 B2 | 2/2004 | Holly | |
| 6,726,236 B2 | 4/2004 | Cofer | 280/475 |
| 6,726,247 B1 | 4/2004 | Snyder | |
| 6,893,006 B2 | 5/2005 | Drake, III | |
| 6,973,693 B1 | 12/2005 | Mayer et al. | 14/71.3 |
| 7,055,859 B2 | 6/2006 | Peveler | |
| 7,073,763 B1 | 7/2006 | Trout | |
| 7,128,330 B2 | 10/2006 | Krauss | 280/456.1 |
| 7,140,157 B2 | 11/2006 | Oliver et al. | |
| 7,188,842 B2 | 3/2007 | Thorpe | |
| 7,338,052 B2 | 3/2008 | Hanscom | 280/6.153 |
| 2002/0117831 A1 | 8/2002 | Ahlquist et al. | |
| 2005/0110260 A1 | 5/2005 | Jacques | 280/763.1 |
| 2006/0017241 A1 | 1/2006 | Hanscom | 280/6.153 |
| 2006/0081755 A1 | 4/2006 | Thorpe | 248/354.1 |
| 2006/0163858 A1 | 7/2006 | Giralde | |
| 2006/0214390 A1 | 9/2006 | Pinnell | 280/475 |
| 2007/0040370 A1 | 2/2007 | Hanscom | |
| 2007/0114734 A1 | 5/2007 | Jacques | 280/6.153 |
| 2007/0221900 A1 | 9/2007 | Giralde | |

OTHER PUBLICATIONS

An "Interview Summary," dated Jan. 28, 2010. The document is from the parent U.S. Appl. No. 11/588,662.

An "Amendment and Response to Office Action," filed with the USPTO on Jan. 22, 2010. The document is from the parent U.S. Appl. No. 11/588,662.

A "Final Office Action," dated Sep. 23, 2009. The document is from the parent U.S. Appl. No. 11/588,662.

TRAILER STABILIZING DEVICE AND METHOD OF USING SAME

This application is a continuation-in-part of and claims the priority date of Utility Application Ser. No. 11/588,662, entitled TRAILER STABILIZING DEVICE AND METHOD OF USING SAME, filed on Oct. 26, 2006, which is a continuation-in-part of Utility application Ser. No. 10/899,921, entitled TRAILER STANILIZING DEVICE AND METHOD OF USING SAME, filed on Jul. 26, 2004. This application incorporates both of the above applications by reference in their entirety.

BACKGROUND OF THE INVENTION

The present invention generally relates to trailer stabilizing devices and more specifically to devices and methods which allow a person to stabilize a trailer with stabilizing members which allow the trailer to be transported without removal of the stabilizing members.

A variety of different stabilizers are known for supporting stationary trailers, which stabilize the trailer and reduce movement of the trailer as people move within the trailer, thus making the trailer more comfortable for the occupants. Many of the known stabilizers must be installed after the trailer is set in place, requiring the positioning and installation of heavy pieces of equipment. Other known stabilizers are complicated, requiring crossing stabilizing bars or other elaborate supports. These stabilizers often are usually used in combination with the support legs usually attached to the bottom of the trailer.

Many trailers, including fifth wheel trailers, utilize ground-engaging support legs at the front of the trailer to support the trailer when the trailer is disengaged from the towing vehicle. Jack stands or landing gear attached to the bottom of the trailer are one type of commonly used ground-engaging support leg. The support legs of these devices may comprise a pair of telescoping members—the upper member and the lower member—which are telescoped with respect to each other by mechanical, hydraulic or electric means. However, because the stroke length may be limited, many of these devices comprise a drop tube member or extension which manually "drops" out of the lower member allowing additional length of the support leg, such that the end of the drop tube member reaches the ground. The end of the drop-tube member may comprise a ground-engaging base plate. The drop tube member is typically held in place using a pin which is inserted through holes in the lower member and corresponding holes in the drop tube member.

When a user desires to move the trailer, it is necessary to raise the ground-engaging base plate from the ground by raising the drop tube member back into the lower member. Depending upon its length and the configuration of any base plate which may be attached to the end of the drop tube member, the drop tube member may be relatively heavy. Depending upon the ground conditions, the drop tube member or base plate may be muddy or dirty such that it is unpleasant for the user to place his or her hands about it to raise it. In addition, depending upon the configuration of the trailer, the user may have to crouch or assume an uncomfortable position to lift the drop tube member back into the lower member.

SUMMARY OF THE INVENTION

The apparatus and method disclosed herein address these problems. The disclosed apparatus may be affixed at various locations at the bottom of a trailer and left attached when the trailer is being transported. The apparatus is relatively simple, and does not require crossed stabilizing bars. An embodiment of the apparatus comprises attachment brackets for the stabilizing bars which attachment brackets have selectively engaging lock mechanisms for restraining the stabilizing bar with respect to the attachment bracket. An embodiment of the apparatus may further comprise a modified base plate, to which stabilizing bars may be attached, to provide greater stability when the ground surface is uneven or unconsolidated. Yet another embodiment of the apparatus provides means for mechanically raising the drop leg of the landing gear and the attached base plate.

The trailer for which the present invention is directed is of the type having a top and a bottom defining a vertical axis, a front and a back defining a longitudinal axis, a first side and a second side defining a transverse axis perpendicular to the longitudinal axis, and ground engaging wheels attached to the bottom. One embodiment of the device comprises a adjustable length leg member. The adjustable length leg member may comprise landing gear or support legs which existed on the trailer at the time of purchase, or the adjustable length leg member may comprise devices which are installed specifically as a component of the disclosed apparatus. For example, the adjustable length leg members may comprise various types of jacks which are attached to the bottom of the trailer.

The disclosed apparatus further comprises a ground engaging base plate which is attached to the end of the adjustable length leg member. The ground engaging base plate comprises attachment means for one or more stabilizer members. The stabilizing member comprises a first end and a second end. The first end comprises means for attachment to the ground engaging base plate. The second end of the stabilizing member attaches to an attachment member which, in turn, is attached to the bottom of the trailer. The attachment member is adapted to slidably receive the second end of the stabilizing member, thereby allowing the effective length of the stabilizer to change.

The attachment member comprises locking means for engaging the stabilizing member and locking the stabilizing member with respect to the attachment member. The locking means allows the length of the stabilizing member disposed between the ground engaging base plate and the attachment member to be adjusted and locked as desired to increase the stability of the trailer. The locking means may be disengaged to allow the raising of the adjustable length leg member and the attached ground engaging base plate. It is to be appreciated that the straight-line distance between the ground engaging base plate and the attachment member is diminished as the ground engaging base plate is raised toward the bottom of the trailer. Therefore, the stabilizing member must slide with respect to the attachment member to allow the raising of the adjustable length leg member.

Another embodiment of the device comprises a drop leg lifting means for affixing to the upper member of the adjustable length leg member. Among other devices, the drop leg lifting means may comprise either a cable winch or ratchet strap attached to the upper member by means of u-shaped bracket. The end of the cable or strap is attached to either the ground engaging base plate or to the drop leg. The winch or ratchet strap may be used to assist in raising the drop tube into the lower member or, if desired, lower the drop tube to the ground in a controlled manner rather than simply allowing the drop tube to fall until the base plate engages the ground.

BRIEF DESCRIPTION OF THE DRAWINGS

For a better understanding of the invention, together with other and further aspects thereof reference is made to the accompanying drawings and detailed description, wherein.

DETAILED DESCRIPTION

The present embodiment is described more fully hereinafter with reference to the accompanying drawings, in which the present embodiment is shown. The following configuration description is presented for illustrative purposes only.

Figure 1:
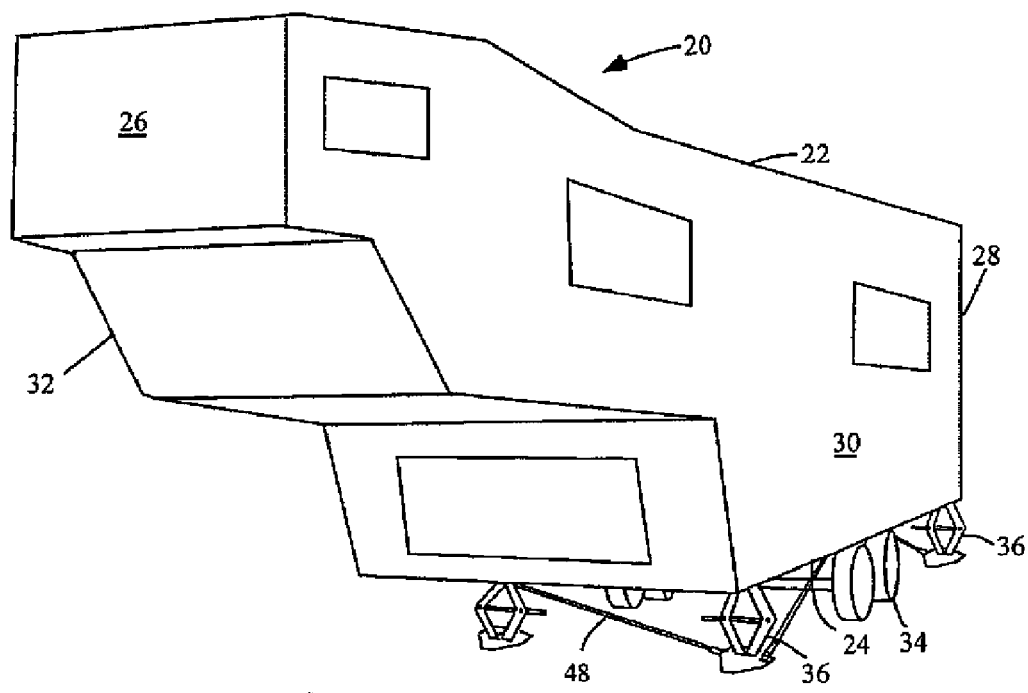
FIG. 1 is a schematic of a trailer, showing how one embodiment of the device may be installed.

Referring now specifically to the drawings, FIG. 1 shows a schematic of a trailer 20 with an embodiment of the stabilizing device installed. The trailer 20 is of the type having a top 22 and a bottom 24 defining a vertical axis, a front 26 and a back 28 defining a longitudinal axis, a first side 30 and a second side 32 defining a transverse axis perpendicular to the longitudinal axis, and ground engaging wheels 34 attached to the bottom 24. As shown in FIG. 1, scissor jacks 36 may be a component of this embodiment. Many trailers 20 come pre-equipped with leveling mechanisms of various types, including scissor jacks 36, which are attached to the bottom 24 of the trailer 20. Other leveling mechanisms may include mechanically, hydraulically, pneumatically, and electrically actuated jacks. The leveling mechanisms are employed to bring the trailer to a relatively level orientation for the comfort of those inside. However, the leveling mechanisms are generally not sufficient on their own to prevent excessive motion of the trailer 20 as people move about inside. Embodiments of the present stabilizing device may incorporate various leveling mechanisms, including those listed above, to improve the stability of the trailer.

Figure 2:
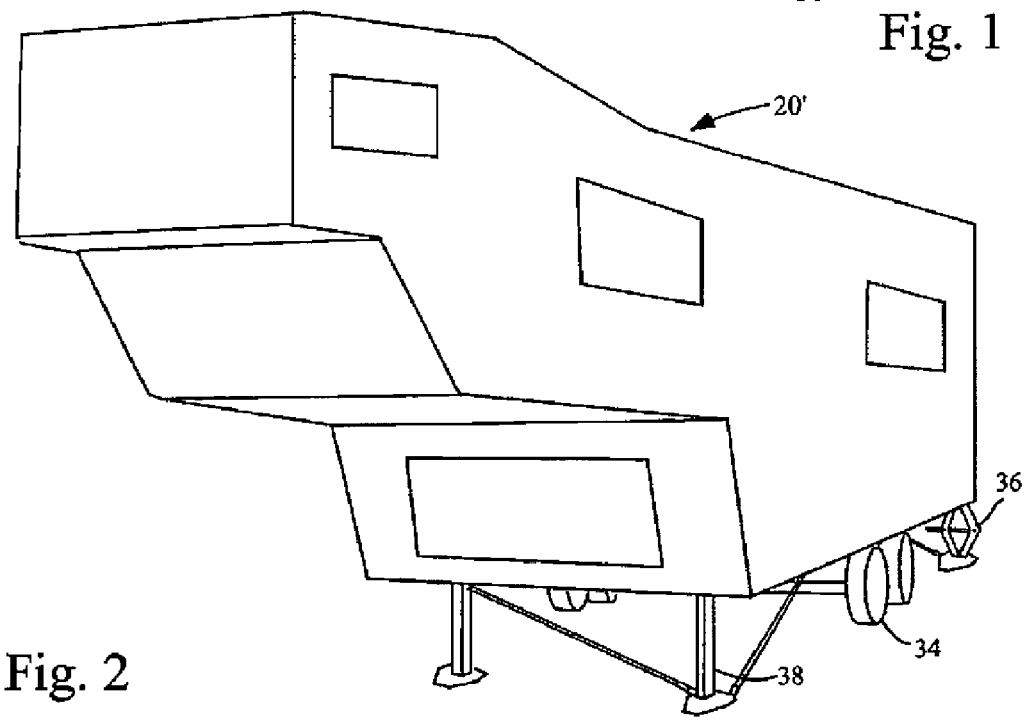
FIG. 2 is a schematic of a trailer, showing how a second embodiment of the device may be installed.

FIG. 2 shows a schematic of a trailer 20' which utilizes a landing gear 38 to support the front 26 of the trailer. As shown in FIG. 2, embodiments of the disclosed stabilizing device may work in combination with landing gear 38. As shown in FIG. 2, trailer 20' may still utilize a combination of embodiments of the device, according to the configuration of a particular trailer. For example, FIG. 2 shows an embodiment of the device utilizing landing gear at the front 26 of the trailer 20' while a different embodiment may utilize scissor jacks 36 or other type of jack. It is to be appreciated that a jack, including scissor jack 36, and/or landing gear 38 may comprise what is referred to herein as an adjustable length leg member.

Figure 3:
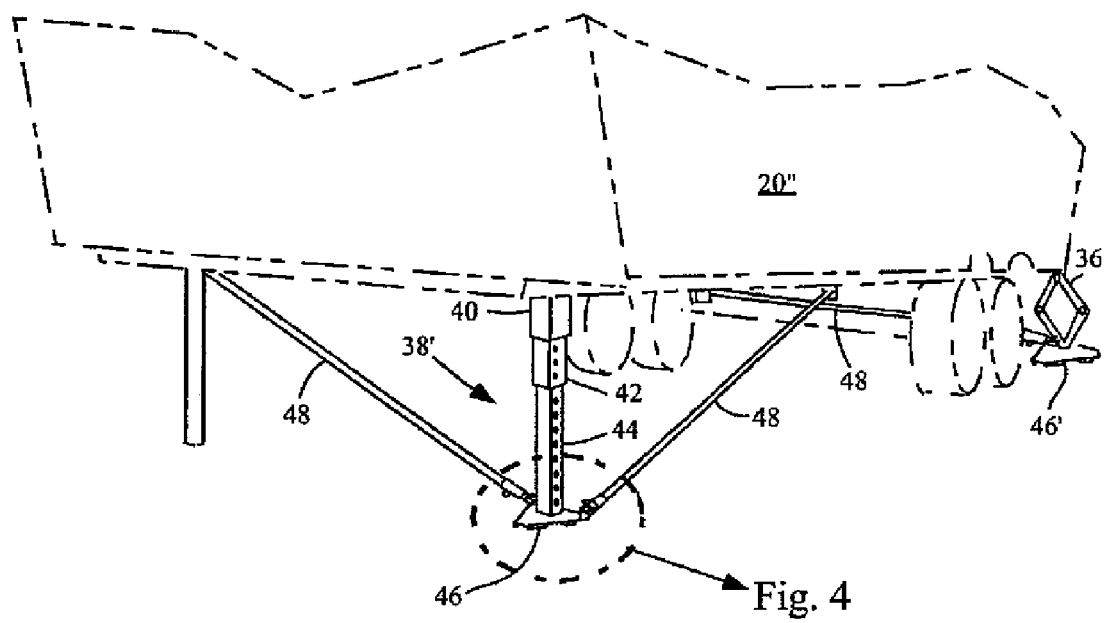
FIG. 3 is a schematic of a trailer, showing how a third embodiment of the device may be installed.
Figure 4:
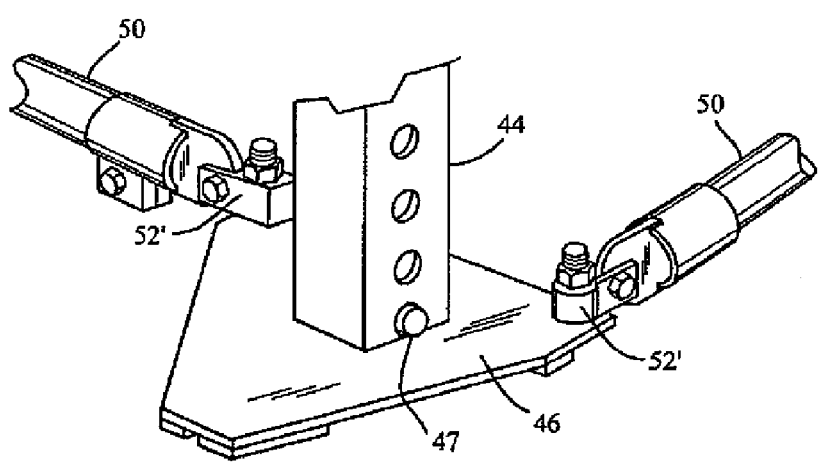
FIG. 4 is a close up view of an embodiment of a ground engaging base plate of FIG. 3 which may be used for attaching one or more stabilizing members.
Figure 4A:
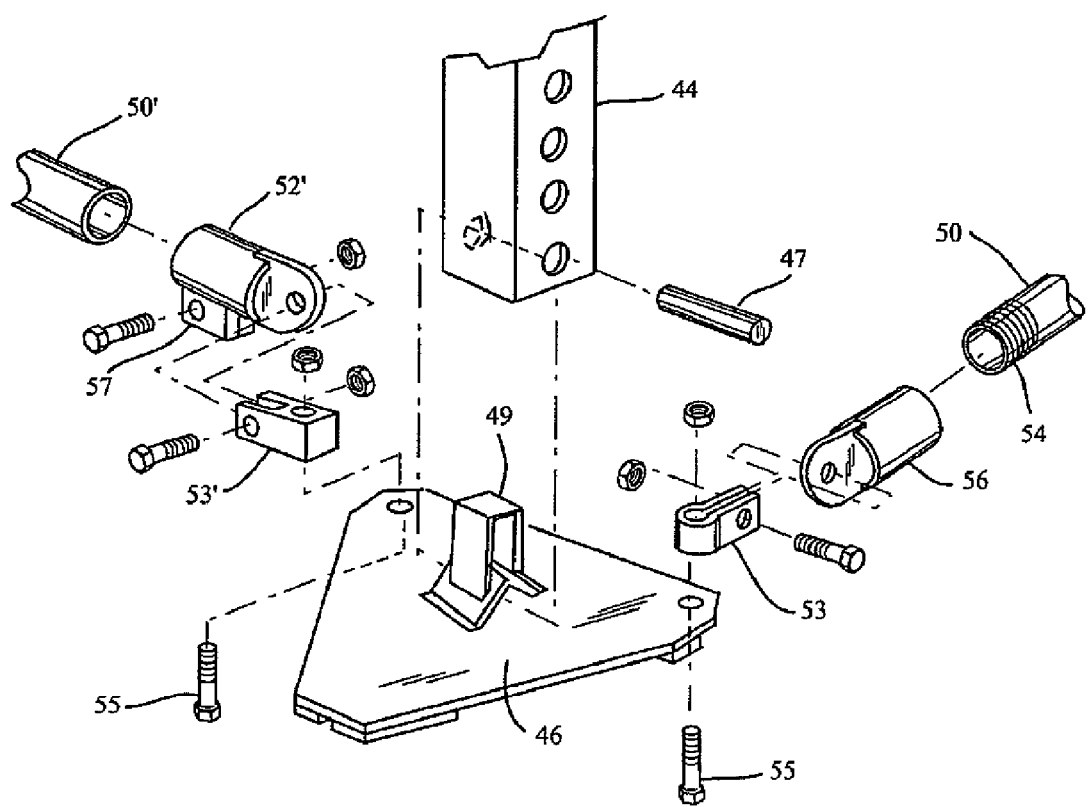
FIG. 4A is an exploded view of the ground engaging base plate of FIG. 2.

FIG. 3 shows a schematic of a trailer 20" which utilizes telescoping landing gear 38'. Telescoping landing gear 38' comprises adjustable length leg members, each having an upper member 40 and a lower member 42 which extends, telescopically, from the upper member 40. Lower member 42 may be extended or retracted by mechanical, hydraulic or electric means. Lower tube member 42 may also comprise drop tube member 44. Drop tube member 44 is an extension which manually "drops" out of lower member 42 when a pin, retaining clip or other securing device is manipulated. Drop tube member 44 provides additional length to the adjustable length leg member, such that the end of the drop tube member reaches the ground. The end of the drop-tube member 44 may comprise a ground engaging base plate 46. The drop tube member is typically held in place using a pin which is inserted through holes in the lower member and corresponding holes in the drop tube member. The ground engaging base plate 46 may attach to the end of drop tube member with a pin or fastener 47 which engages base plate extension 49, as shown in FIG. 4A.

Ground engaging base plate 46 comprises attachment means for one or more stabilizer members 48. The stabilizing member comprises a first end 50 and a second end 52. The first end 50 attaches to the ground engaging base plate 46. As shown in greater detail in FIG. 4 and FIG. 5, ground engaging base plate 46 may comprise attachment brackets 53, 53'. Attachment bracket 53 may be attached to ground engaging base plate 46 with fastener 55. First end 50 may comprise threads 54. Alternatively, first end 50' may comprise a plain end. First end 50 may pivotally attach to attachment bracket 53 with end piece 56, which has internal threads to match threads 54. Alternatively, first end 50' may pivotally attach to mounting bracket 53' which utilizes a compression clamp 57 to attach the mounting bracket 53' to first end 50'. It is to be appreciated that either type of connector may be used exclusively to pivotally attach the stabilizer members 48 to the ground engaging base plate 46.

Figure 7:
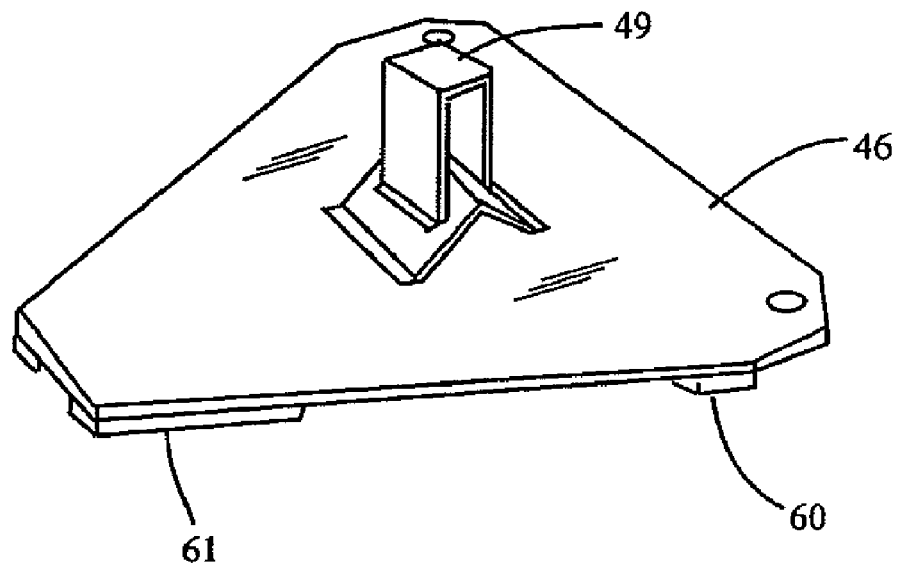
FIG. 7 shows a perspective view of an embodiment of a ground engaging base plate which may be utilized with the disclosed apparatus.
Figure 8:
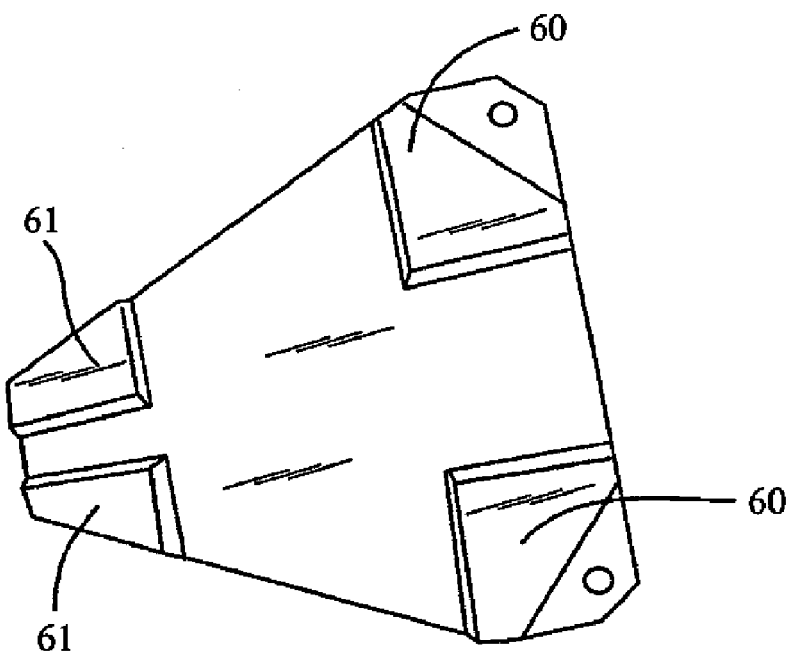
FIG. 8 shows a bottom view of the ground engaging base plate of FIG. 7.
Figure 9:
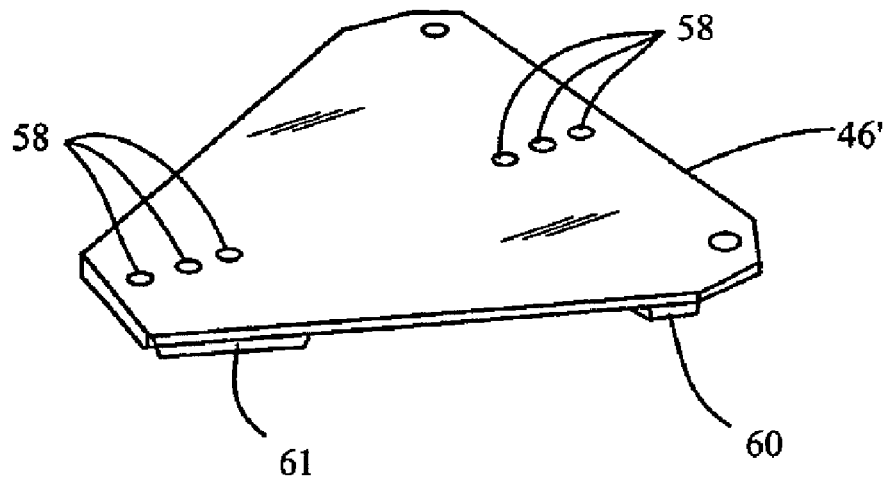
FIG. 9 shows a perspective view of another embodiment of a ground engaging base plate which may be utilized with the disclosed apparatus.
Figure 10:
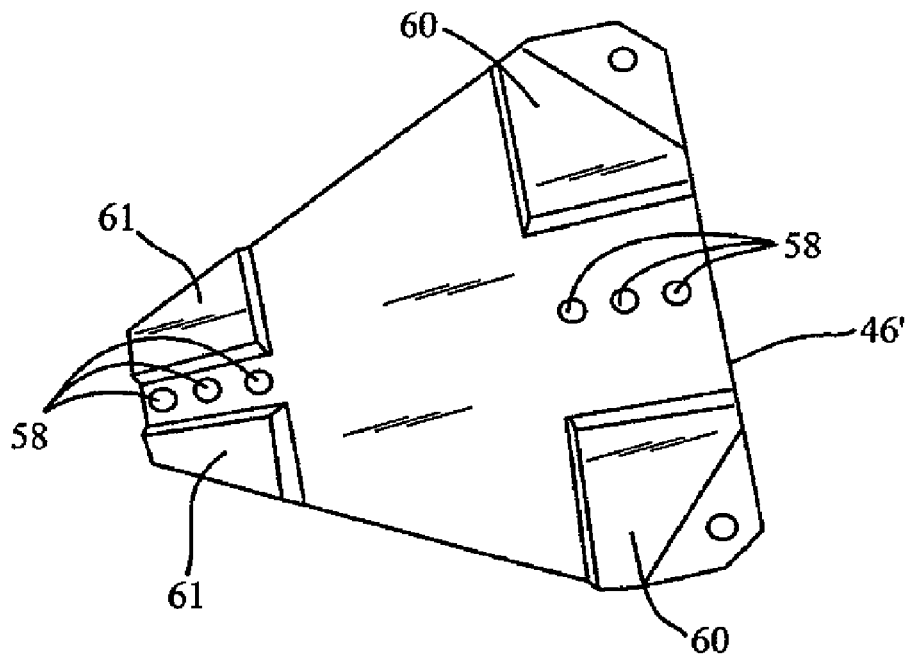
FIG. 10 shows a bottom view of the ground engaging base plate of FIG. 9.

FIGS. 7 through 10 show embodiments of ground engaging base plate 46, 46' which may be utilized with different embodiments of the disclosed apparatus. FIGS. 7 and 8 depict a base plate 46 which may be used with either fixed length or adjustable length leg members of a landing gear 38, 38' type support, as shown in FIGS. 2 and 3, while FIGS. 9 and 10 depict a ground engaging base plate 46' which may be used with the adjustable length leg member of a jack stand or scissor jack. Ground engaging base plate 46 comprises base plate extension 49 which extends up into the drop tube member 44 or other portion of the adjustable length leg member of the landing gear 38. However, the ground engaging base plate 46' shown in FIGS. 9 and 10 is configured to attach to a scissor jack 36, which is bolted to the base plate 46' utilizing holes 58. Base plate extension 49 is not required for this embodiment of the ground engaging base plate 46'.

Both embodiments of the ground engaging base plate 46, 46' may comprise ground engaging foot members 60, 61. Ground engaging foot members 60, 61 allow ground engaging base plate 46, 46' to have increased stability on uneven or unconsolidated ground surfaces. As shown in FIG. 8, the foot members 60, 61 may be disposed in a generally triangular configuration, with two larger triangular pads 60 at the rear of the base plate 46, 46' and either one or two smaller pads 61 located at the front end of the base plate. This general configuration of ground engaging foot members 60, 61 allow the ground engaging base plate 46, 46' to be self-leveling and thereby more stable.

Figure 5:
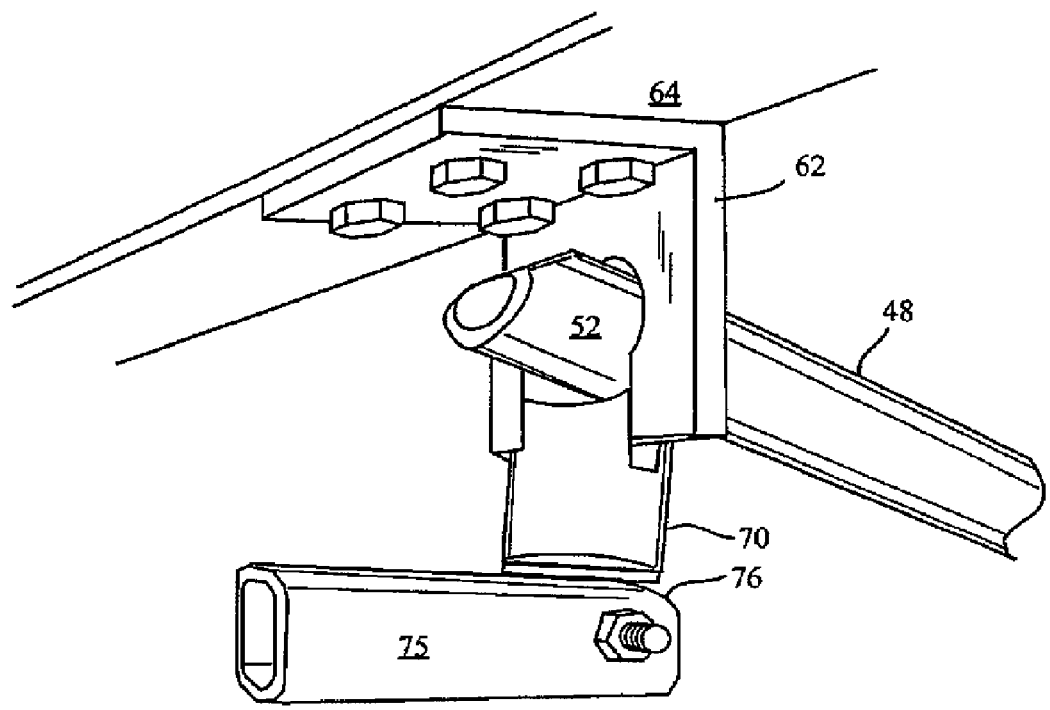
FIG. 5 shows a close up view of an embodiment of an attachment member which may be used for attaching an end of a stabilizing member to the chassis of a trailer.
Figure 6:
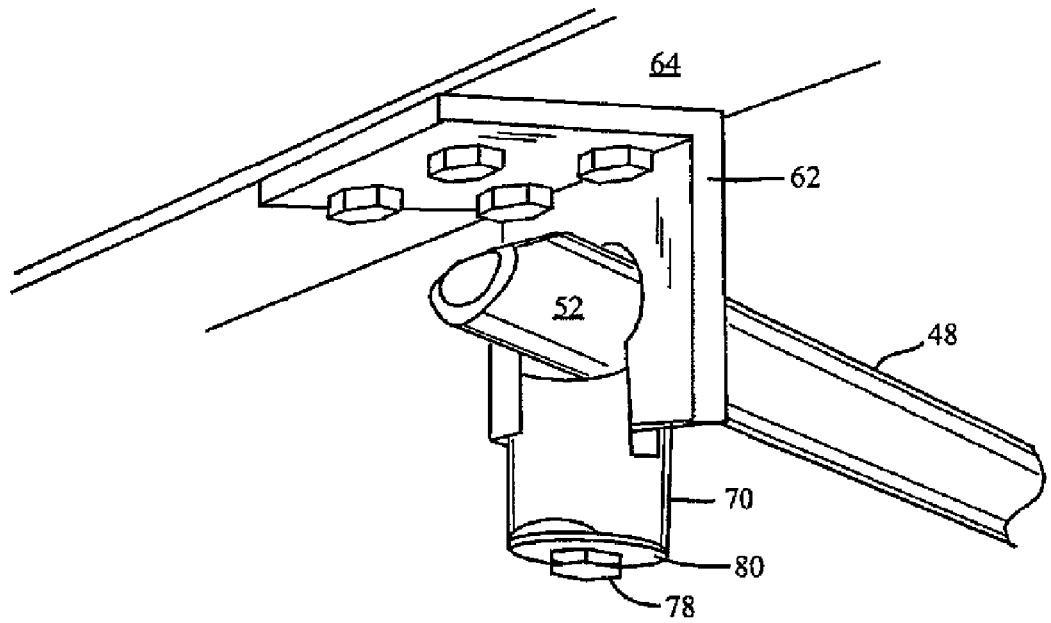
FIG. 6 shows a close up view of another embodiment of an attachment member which may be used for attaching an end of a stabilizing member to the chassis of a trailer.
Figure 5A:
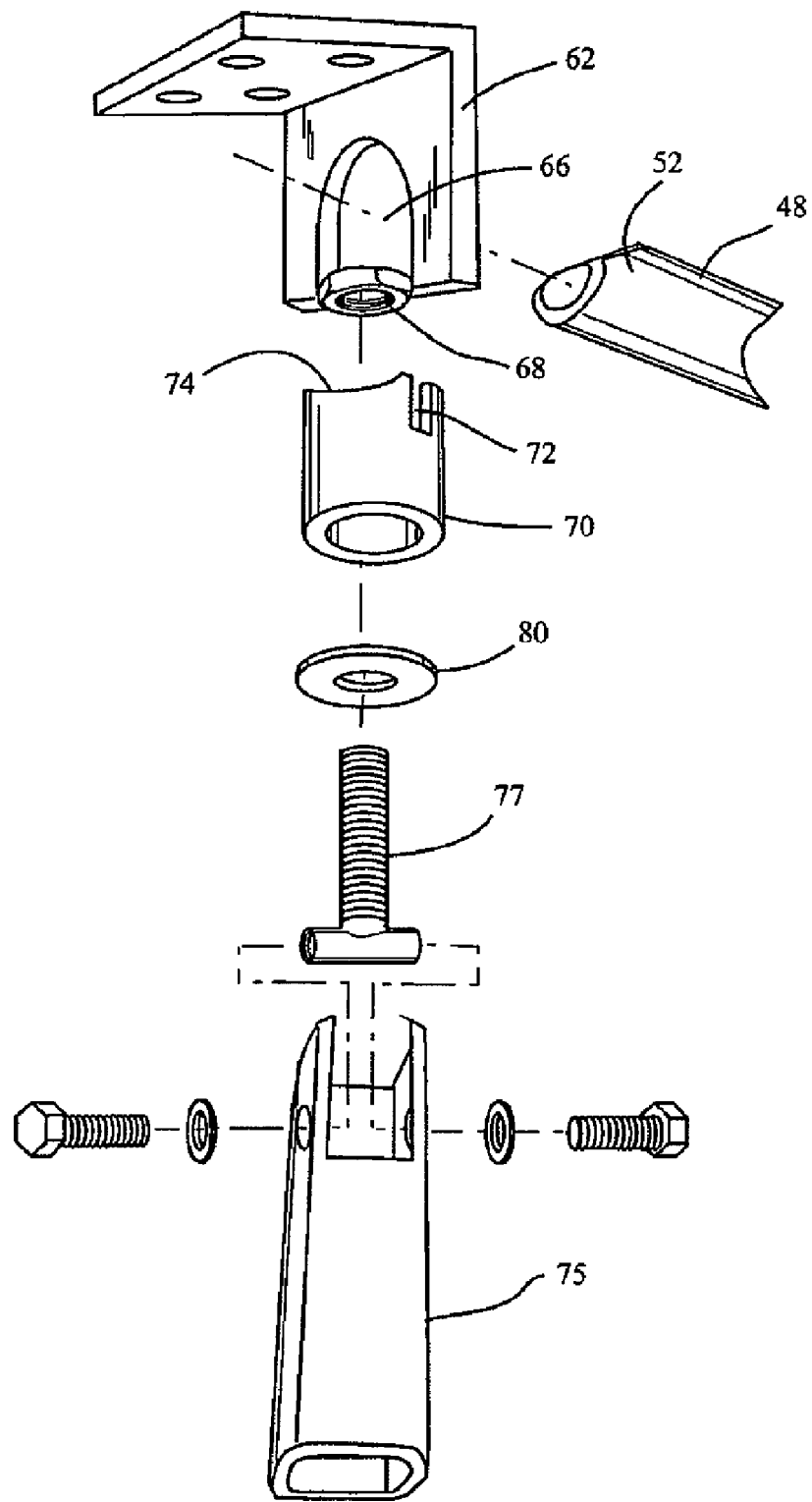
FIG. 5A shows an exploded view of the attachment member of FIG. 5.

The second end 52 of stabilizing member 48 attaches to attachment member 62 which attaches to a structural member 64 or other suitable attachment point at the bottom 24 of the trailer 20. As shown in the embodiments depicted in FIGS. 5-6, attachment member 62 is adapted to slidably receive the second end 52 of the stabilizing member 48. As shown in FIG. 5A, attachment member 62 comprises an opening 66 which is sufficiently large to receive the second end 52 of the stabilizing member 48. As shown in FIGS. 5-6, selective locking means engage the stabilizing member 48. The selective locking means allow the user to position the stabilizer as desired with respect to the attachment member 62 by causing the stabilizing member 48 to slide through the opening 66 as the adjustable length leg member is set in the desired position and the ground engaging base plate 46 is set upon the ground. Once the adjustable length leg member is set in the desired position and the ground engaging base plate 46 set upon the ground, the selecting locking means are activated such that the stabilizing member 48 is locked in place with respect to attachment member 62, thus providing a fixed support extending between the base plate and the bottom 24 of the trailer 20. As shown in FIGS. 5-6, the selective locking means acts upon the stabilizing member 48 at the periphery of opening 66.

Figure 6A:
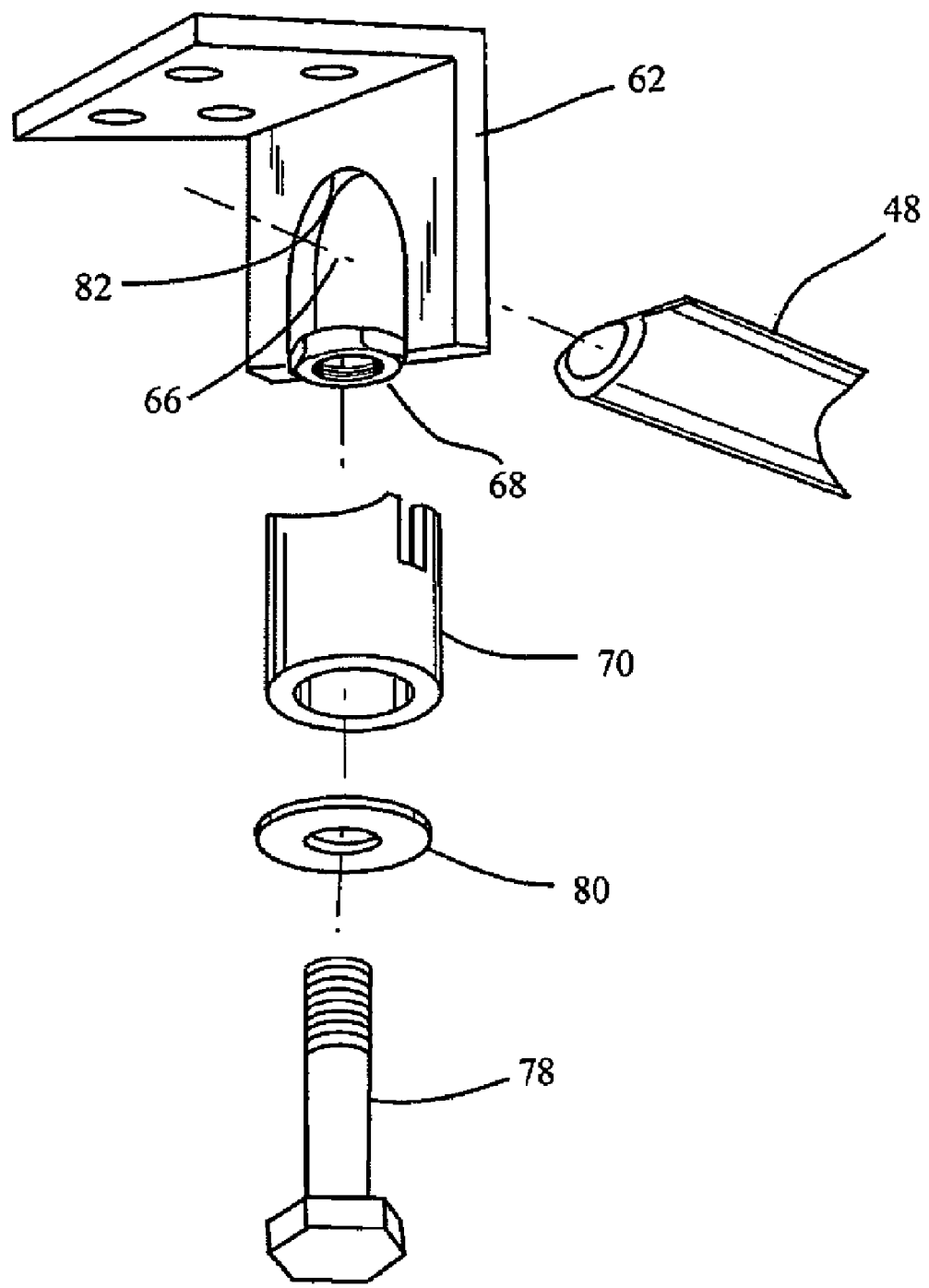
FIG. 6A shows an exploded view of the attachment member of FIG. 6.

As shown in greater detail in FIGS. 5A and 6A, attachment member 62 comprises a threaded aperture such as nut 68 which partially bounds opening 66. It is to be appreciated that the threaded aperture might also be formed as an integral part of attachment member 62 in contrast to using a discrete device such as nut 68. The threaded aperture is generally normal to the opening 66, such that the threaded fastener made up into the threaded aperture will be at an angle approaching 90 degrees with respect to stabilizing member 48.

FIGS. 5 and 5A show one type of selective locking means which may be utilized for the disclosed stabilizing device. The selective locking means may comprise a sleeve member 70. As shown in greater detail in FIG. 5A, sleeve member 70 comprises a generally cylindrical member having slots 72 on either side of the sleeve. Slots 72 are configured to fit over the lower portion of attachment member 62. Sleeve member 70 has a diameter sufficiently large to slide over nut 68. If stabilizing member 48 is in a round configuration, such as that indicated in the figures herein, the upper end 74 of sleeve member 70 may be contoured to increase the contact surface between stabilizing member 48 and sleeve member 70. It is to be appreciated that other shapes of stabilizing member 48 may be utilized, such as oval, elliptical, or square, without changing the functioning of the disclosed device.

FIGS. 5 and 5A show one embodiment of the selective locking means which utilizes a handle member 75 to urge the sleeve member 70 against the side of stabilizing member 48. The locking means further comprises a threaded fastener 77 pivotally attached to the handle member. The handle member 72 further comprises a cam surface 76 which engages sleeve member 70. As shown in FIG. 5, when handle member 72 is rotated from a horizontal to vertical position, cam surface 76 rotates and urges sleeve member 70 upwardly, thereby engaging stabilizing member 48 and locking it into position.

FIGS. 6 and 6A show another embodiment of the selective locking means. In this embodiment sleeve member 70 is urged upwardly against the side of stabilizing member 48 by fastener 78. Washer 80 may be utilized for engaging the bottom of sleeve member 70. In this embodiment, stabilizing member 48 is locked into position with respect to attachment member 62 by fastener 78 being made up into the threaded aperture, such as nut 68. As fastener 78 is made up into the threaded aperture, the stabilizing member 48 is sandwiched between the upper boundary 82 of opening 66 and sleeve member 70. Moreover, fastener 78 may also engage stabilizing member 48.

Figure 11:
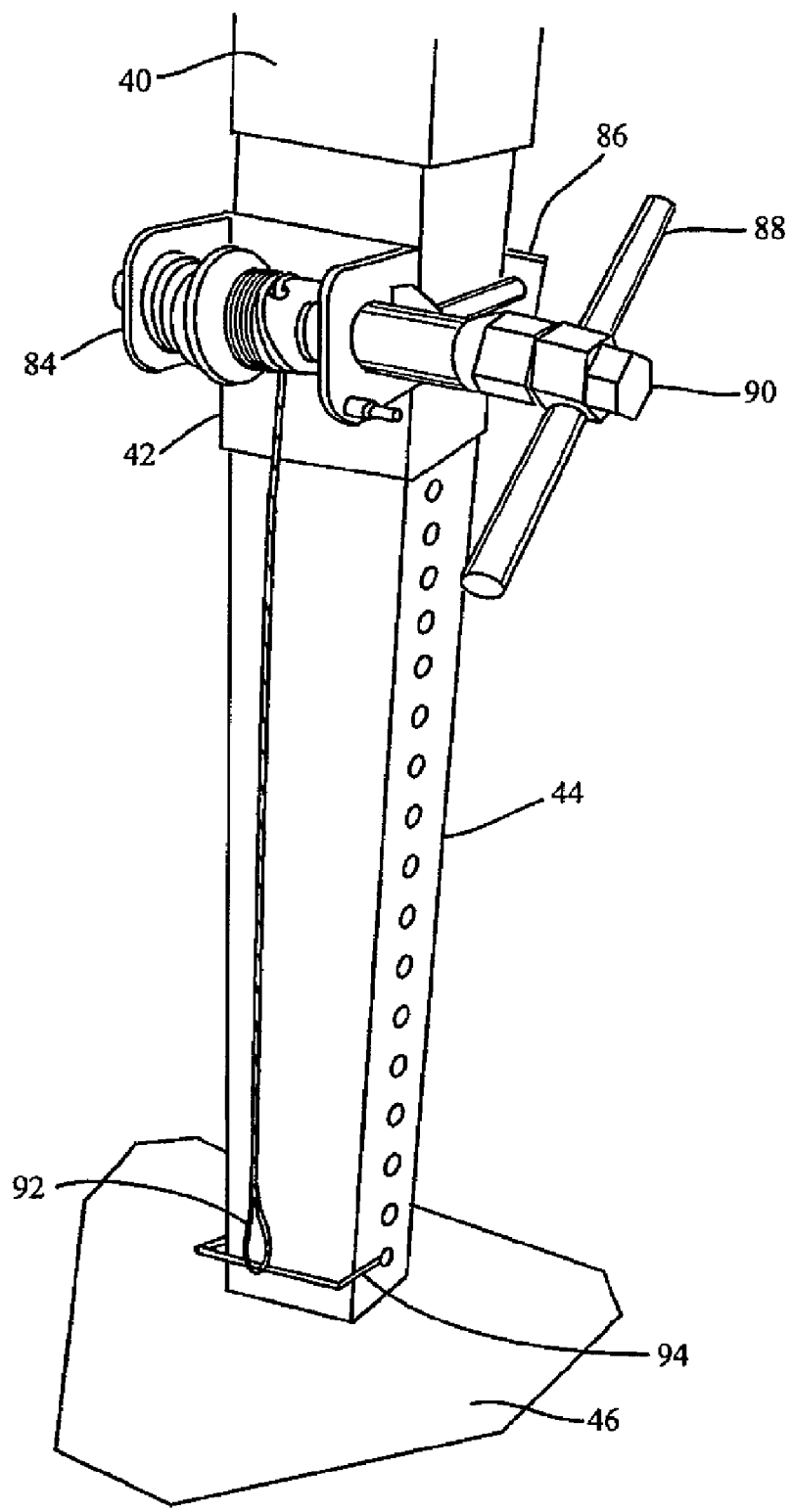
FIG. 11 shows how a winch may be attached to an adjustable length leg member to provide drop leg lifting means.
Figure 12:
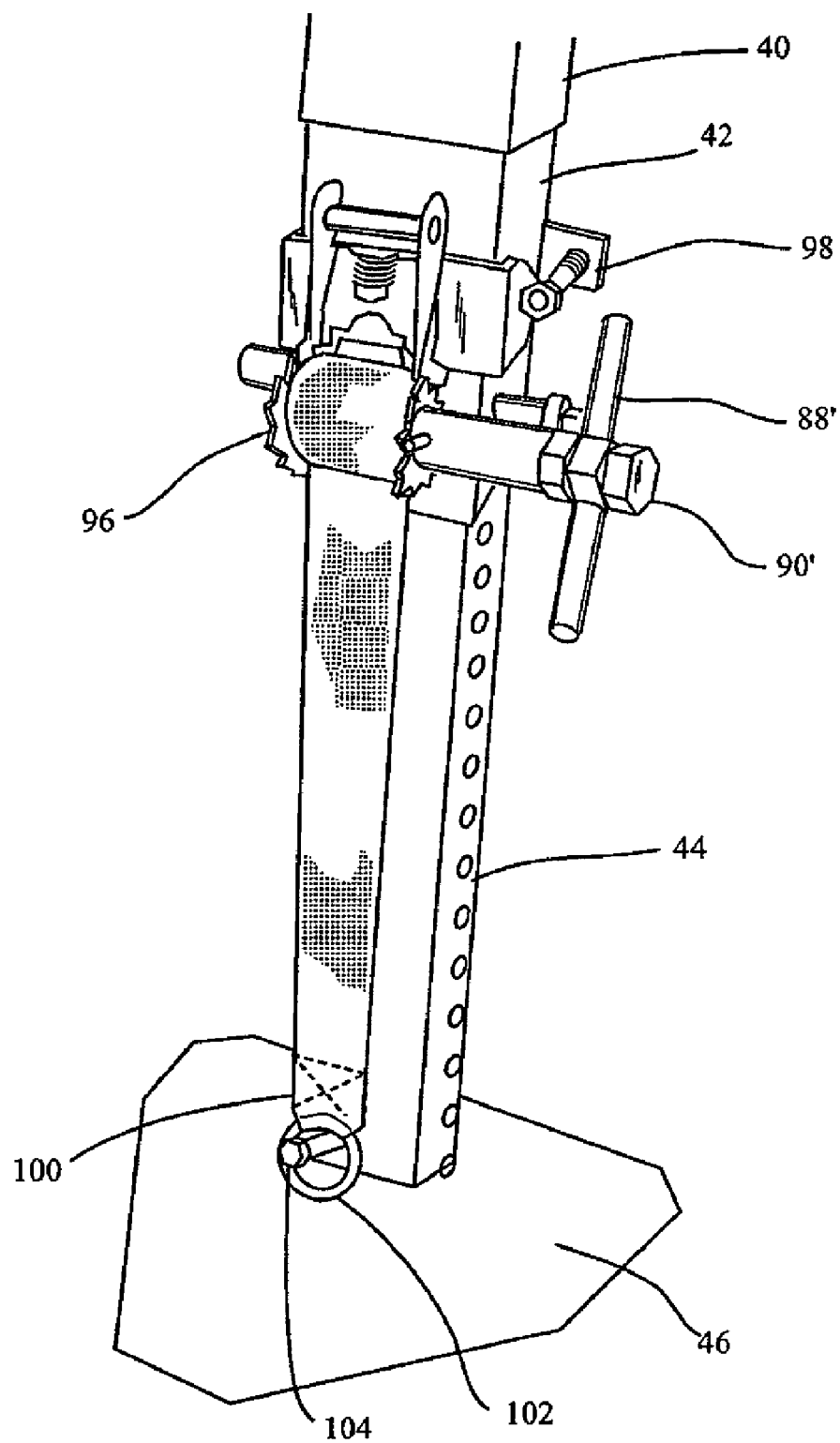
FIG. 12 shows how a strap ratchet may be attached to an adjustable length leg member to provide drop leg lifting means.

FIGS. 11 and 12 depict different means which may be employed as lifting means for drop leg 44. The lifting means are attached to either upper member 40 or to lower member 42. FIG. 11 shows a cable winch 84 which is shown attached to lower member 42 with bracket 86. Cable winch 84 may be rotated using handle 88. Alternatively, an extended reach handle may utilized which handle has a socket adapted to engage hex head 90. Cable end 92 is attached to drop leg 44 or to ground engaging base plate 46. For example, a lifting bracket 94 may be attached to drop leg 44 as shown in FIG. 11. Additional lifting means may also be employed to assist in raising drop leg 44. For example, a spring or elastic cord (not shown) may be disposed between lower member 42 and drop leg 44, such that the spring or elastic cord is stretched as the drop leg is dropped. It is to be appreciated that the spring or elastic cord should be sized such that the weight of the drop leg is sufficient to overcome the spring resistance of the spring or cord. Such spring, elastic cord, or other additional lifting means may be attached inside lower member 42 and drop leg 44.

FIG. 12 shows a ratchet strap 96 which is shown attached to lower member 42 with bracket 98. Ratchet strap 96 may be rotated using handle 88'. As with cable winch 84, an extended reach handle may be utilized which handle has a socket adapted to engage hex head 90'. Strap end 100 is attached to drop leg 44 or ground engaging base plate 46. For example, as shown in FIG. 12, lifting loop 102 may be attached to strap end 100, with the lifting loop attached to bolt 104 which is attached to drop leg 44.

Figure 13:
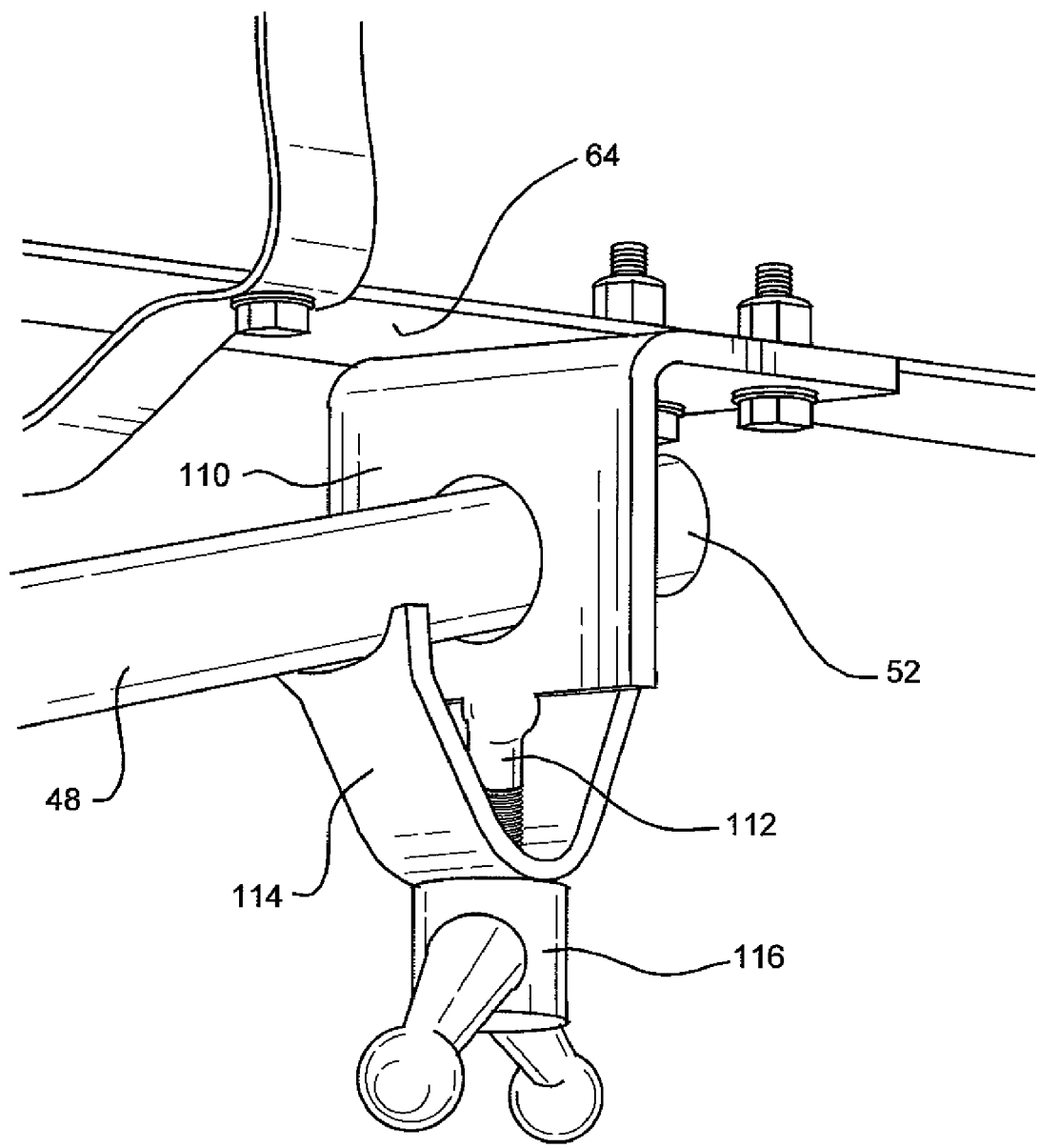
FIG. 13 shows a pictorial view of an embodiment of an attachment member which may be used for attaching an end of a stabilizing member to a trailer.

Referring now to FIG. 13, shown is a pictorial view of an embodiment of an attachment member 110 which may be used for attaching a stabilizing member 48 to a trailer structural member 64. The attachment member 110 may removably or permanently attached at one end to the structural member 64 of the trailer by conventional fastening means such as, but not limited to, bolts (for removability) or welding (for permanence). The attachment member 110 may be adapted to receive the second end 52 of the stabilizing member 48. The attachment member 110 may have a threaded portion 112 at one end, although not limited to this embodiment. A threaded fastener 116 may be adapted to receive the threaded portion 112 and when tightened may urge a bracing member 114 or bracket upwards, although not limited to this embodiment. The bracing member 114 may removably and adjustably secure the stabilizing member 48 in place when the threaded fastener 116 is tightened.

Figure 14:
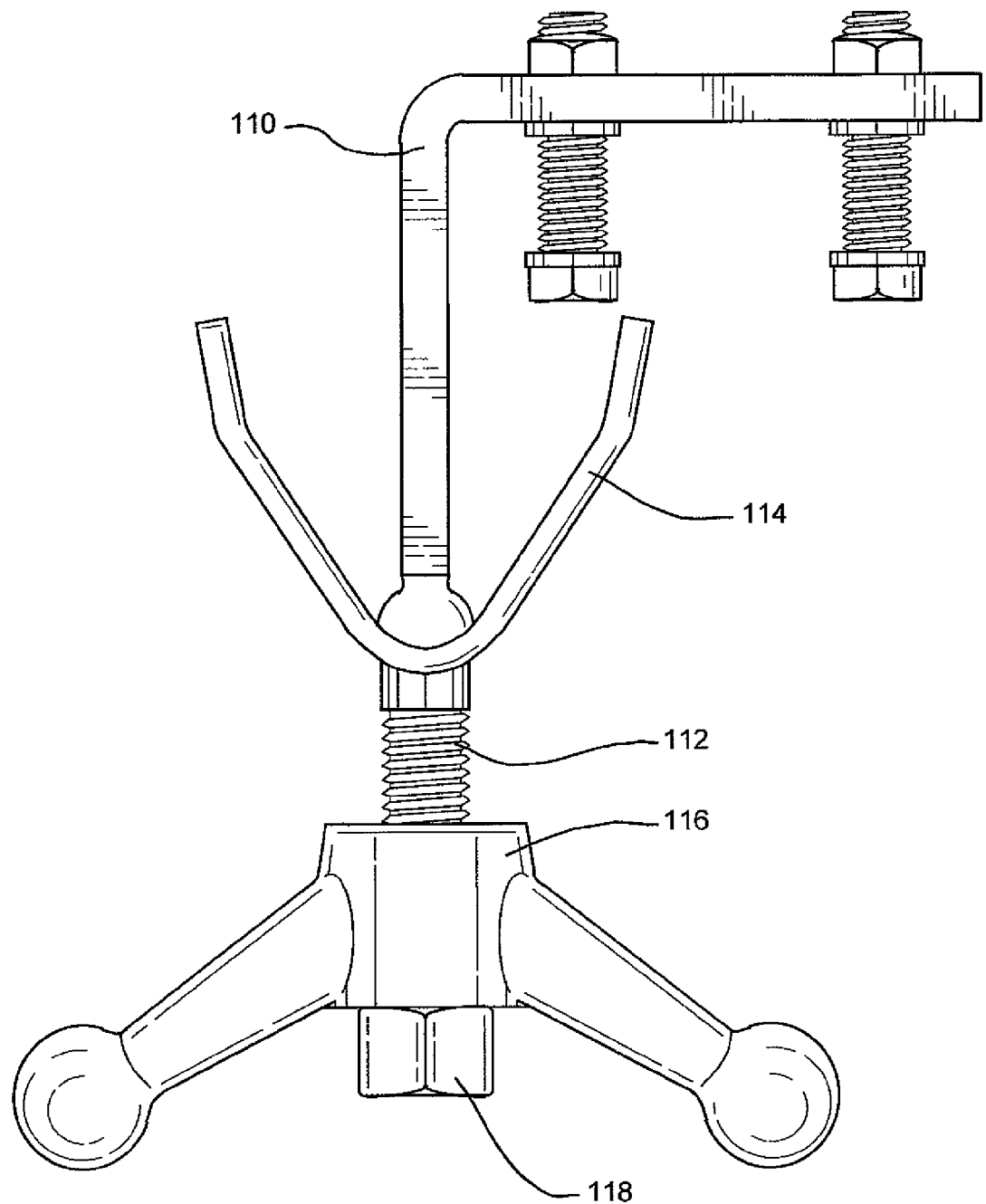
FIG. 14 shows a close up pictorial view of the attachment member of FIG. 13.

Referring now to FIG. 14, shown is a close up pictorial view of the attachment member 110 of FIG. 13. The bracing member 114 may be generally v-shaped, although not limited to this shape, so as to brace either side of the stabilizing member 48 (shown in FIG. 13) received by the attachment member 110. The bracing member 114 may be urged upwards as the threaded fastener 116 is tightened, although not limited to this embodiment. The threaded fastener 116 may also have a locking nut 118, although not limited to this embodiment, which may secure the threaded fastener 116 in place. It is appreciated that any number of devices could be used to secure the threaded fastener 116 in place, including a cotter pin, although not limited to this embodiment.

Figure 15:
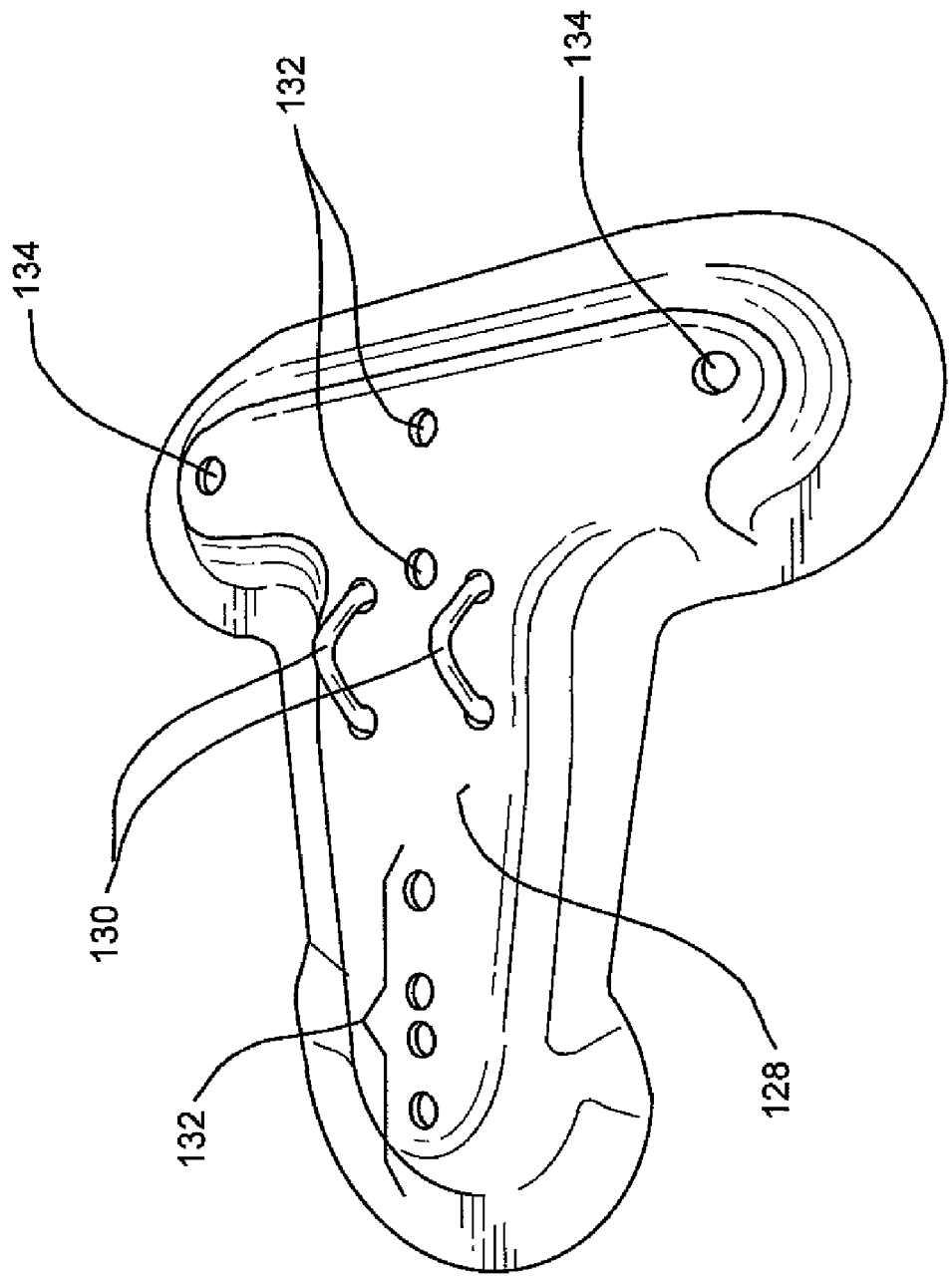
FIG. 15 shows a pictorial view of an embodiment of a ground engaging base plate.

Referring now to FIG. 15, shown is a pictorial view of an embodiment of a ground engaging base plate 128. The ground engaging base plate 128 has holes 132 similar to those found in FIGS. 9 and 10 for securing a leg member of a trailer, such as a scissor jack, although not limited to this embodiment. In addition, the ground engaging base plate 128 may have angled members such as u-bolts 130, v-bolts, or some similar means, although not limited to this embodiment, for securing a drop tube member 44 or other adjustable length member of a trailer landing gear (shown in FIG. 17). It is appreciated that u-bolts 130, v-bolts, other angled members, or some similar means may be either removable or permanently affixed to the ground engaging base plate 128. Other holes 134 may be provided for fastening attachment brackets (shown in FIG. 17) that may secure stabilizing members, although not limited to this embodiment.

Figure 16:
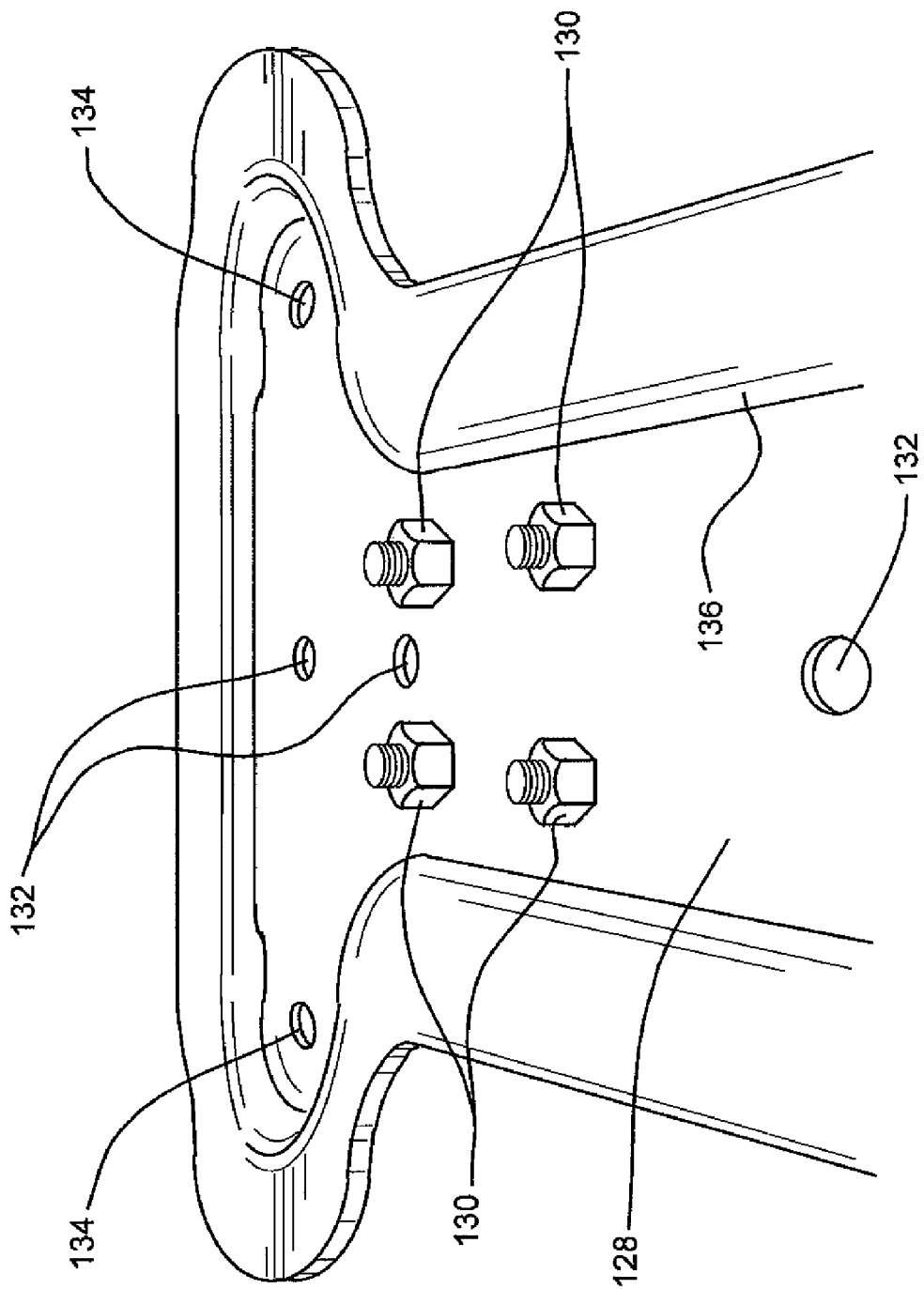
FIG. 16 shows a pictorial bottom view of a portion of the ground engaging base plate of FIG. 15.

Referring now to FIG. 16, shown is a pictorial bottom view of a portion of the ground engaging base plate 128 of FIG. 15. The bottom of the u-bolts 130, v-bolts, other angled members, or some similar means may be secured to the ground engaging base plate 128 with nuts, although not limited to this embodiment. In this way the u-bolts 130, v-bolts, other angled members, or some similar means may be adjusted or removed entirely from the ground engaging base plate 128. The u-bolts 130, v-bolts, other angled members, or some similar means may permit attachment of a trailer leg or some similar device securely to the ground engaging base plate 128.

The bottom of the ground engaging base plate 128 may have a raised wall 136 or edge to keep securing components such as the bottom of the u-bolts 130, v-bolts, other angled members, or some similar means from direct contact with the ground, although not limited to this embodiment. The raised wall 136 may also add stiffness or strength to the ground engaging base plate 128 and may be designed to provide greater anchoring with the ground, although not limited to this embodiment. For example, although not limited thereto, if the ground engaging base plate 128 is constructed in a generally triangular shape, the raised wall 136 may assure that each angle of the generally triangular shape sufficiently meets the ground. This may permit the ground engaging base plate 128 to self level on uneven terrain and insures that the ground engaging base plate 128 is properly anchored to the ground, although not limited to this embodiment.

Figure 17:
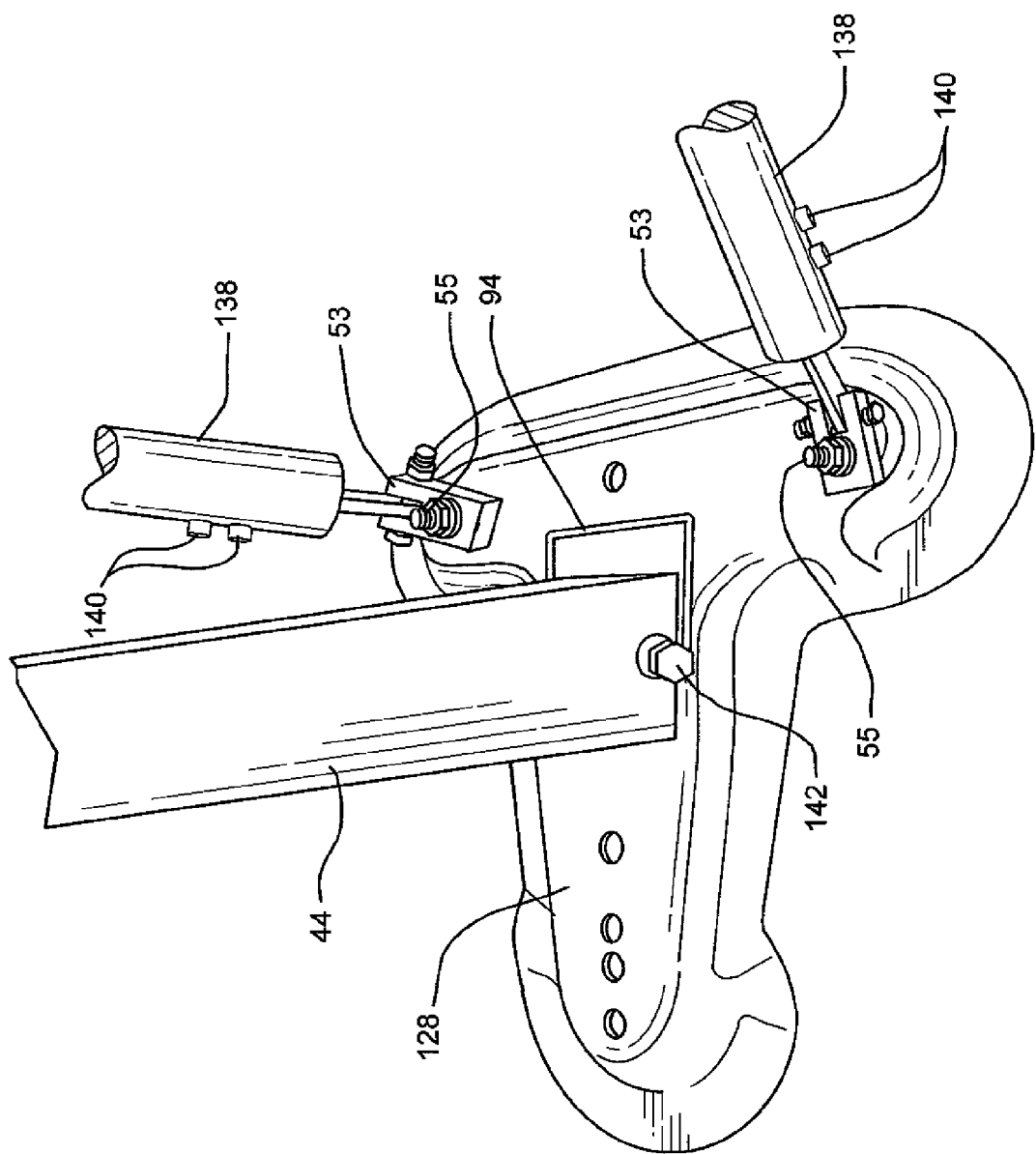
FIG. 17 is a close up pictorial view of an embodiment of a ground engaging base plate of FIG. 15 which may be used for attaching one or more stabilizing members.

Referring now to FIG. 17, shown is a close up pictorial view of an embodiment of a ground engaging base plate 128 of FIG. 15 which may be used for attaching one or more stabilizing members 48 (not shown in this figure). A drop tube member 44 may be placed over the u-bolts 130, v-bolts, other angled members, or some similar means (shown in FIGS. 15 and 16) and secured in place by a bolt 142 or similar means, although not limited to this embodiment. Fasteners 55 may use the holes 134 (shown in FIGS. 15 and 16) to fasten attachment brackets 53 to the ground engaging base plate 128, although not limited to this embodiment. Attachment brackets 53 in turn secure end pieces 138, which may receive the ends of stabilizing members 48 (not shown in this figure), although not limited to this embodiment. The ends of stabilizing members 48 (not shown in this figure) may be received by tubular end pieces 138 and secured in place by set screws 140, although not limited to this embodiment. It is appreciated that set screws may be placed anywhere along the length of the end pieces 138 so that they permit stabilizing members 48 (not shown in this figure) of varying sizes to be used with the system and may also be adjusted in length.

While the present invention has been described above in terms of specific embodiments, it is to be understood that the invention is not limited to these disclosed embodiments. Many modifications and other embodiments of the invention will come to mind to those skilled in the art to which this invention pertains, and which are intended to be and are covered by both this disclosure and the appended claims. For example, the size, shape, and/or material of the various components may be changed as desired. It is intended that the scope of the invention should be determined by proper interpretation and construction of the appended claims and their legal equivalents, as understood by those of skill in the art relying upon the disclosure in this specification and the attached drawings.

What is claimed is:

1. A device for stabilizing a stationary trailer, the trailer having a top and a bottom, the device comprising:
   at least one stabilizing member comprising a first end and a second end,
   at least one attachment member for attachment to the trailer, said attachment member having an opening defined within and passing through a plane substantially normal to the trailer bottom and configured to slidably receive the second end of the stabilizing member,
   at least one adjustable length leg member attached to the bottom of the trailer,
   the at least one adjustable length leg member having a ground engaging portion, the ground engaging portion comprising an attachment means for pivotally connecting the first end of the at least one stabilizing member to the portion of the at least one adjustable length leg member,
   and at least one selective locking means for engaging the at least one stabilizing member along its outer portion at a desired location along the length of the stabilizing member and restraining axial motion of the stabilizing member with respect to the at least one attachment member, the selective locking means comprising:
   a first threaded portion adjacent to the opening of the at least one attachment member, and a second threaded portion for matingly engaging the first threaded portion.

2. The device of claim 1 wherein the first threaded portion has threads on its outside and the second threaded portion has threads on its inside.

3. The device of claim 1 further comprising a locking nut that may urge against the second threaded portion to secure it in place.

4. The device of claim 2 further comprising a locking nut that may urge against the second threaded portion to secure it in place.

5. The device of claim 1 wherein the second threaded portion comprises a handle member.

6. The device of claim 2 wherein the second threaded portion comprises a handle member.

7. The device of claim 1 wherein the at least one attachment member further comprises a movable bracing member for engaging the at least one stabilizing member.

8. The device of claim 2 wherein the at least one attachment member further comprises a movable bracing member for engaging the at least one stabilizing member.

9. The device of claim 7 wherein the bracing member engages the at least one stabilizing member as the second threaded portion is tightened and urges the bracing member against the at least one stabilizing member.

10. The device of claim 8 wherein the bracing member engages the at least one stabilizing member as the second threaded portion is tightened and urges the bracing member against the at least one stabilizing member.

11. The device of claim 1 wherein the ground engaging portion of the at least one adjustable length leg member comprises a ground engaging base plate having a raised portion on its bottom to prevent direct contact of any securing components with the ground and permits the ground engaging base plate to self level on uneven terrain.

12. The device of claim 11 wherein the ground engaging base plate further comprises one or more angled members secured to the ground engaging base plate to permit attachment of the at least one adjustable length leg member.

13. A device for stabilizing a stationary trailer, the trailer having a top and a bottom, the device comprising:
   at least one stabilizing member comprising a first end and a second end,
   at least one attachment member, said attachment member having a first portion for attachment to the trailer bottom and a second portion substantially perpendicular to said first portion, said second portion having an opening completely therethrough configured to slidably receive the second end of the stabilizing member,
   at least one adjustable length leg member attached to the bottom of the trailer,
   the at least one adjustable length leg member having a ground engaging portion, the ground engaging portion comprising an attachment means for pivotally connecting the first end of the at least one stabilizing member to the portion of the at least one adjustable length leg member,
   and at least one selective locking means for engaging the at least one stabilizing member along its outer portion at a desired location along the length of the stabilizing member and restraining axial motion of the stabilizing member with respect to the at least one attachment member, the selective locking means comprising:
   a first threaded portion on said first portion of the at least one attachment member, and a second threaded portion for matingly engaging the first threaded portion.

14. The device of claim 13 wherein the first threaded portion has threads on its outside and the second threaded portion has threads on its inside.

15. The device of claim 13 further comprising a locking nut that may urge against the second threaded portion to secure it in place.

16. The device of claim 14 further comprising a locking nut that may urge against the second threaded portion to secure it in place.

17. The device of claim 14 wherein the second threaded portion comprises a handle member.

18. The device of claim 13 wherein the at least one attachment member further comprises a movable bracing member for engaging the at least one stabilizing member.

19. The device of claim 18 wherein the bracing member engages the at least one stabilizing member as the second threaded portion is tightened and urges the bracing member against the at least one stabilizing member.

20. The device of claim 13 wherein the ground engaging portion comprises a base plate having a raised portion on its bottom to prevent direct contact of any securing components with the ground and permit the ground engaging base plate to self level on uneven terrain.

21. The device of claim 1 wherein a portion of the first end of the at least one stabilizing member lies substantially parallel to the bottom of the trailer.

22. The device of claim 13 wherein a portion of the first end of the at least one stabilizing member lies substantially parallel to the bottom of the trailer.

23. The device of claim 1 being in combination with the trailer and the attachment member being fixedly secured to the bottom of the trailer.

24. The device of claim 13 being in combination with the trailer and the first portion of the attachment member being fixedly secured to the bottom of the trailer.

* * * * *